United States Patent
Schrems et al.

(10) Patent No.: US 9,099,910 B2
(45) Date of Patent: Aug. 4, 2015

(54) MULTI-MODE MOTOR FOR SWITCHING AMONG MOTOR POWER SUPPLIES

(75) Inventors: Adam Joshua Schrems, Chicago, IL (US); Brian Roy Skotty, Elmhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 881 days.

(21) Appl. No.: 13/275,478

(22) Filed: Oct. 18, 2011

(65) Prior Publication Data

US 2013/0094979 A1    Apr. 18, 2013

(51) Int. Cl.
*H02P 7/00* (2006.01)
*H02K 23/36* (2006.01)
*H02P 7/285* (2006.01)

(52) U.S. Cl.
CPC ............. *H02K 23/36* (2013.01); *H02P 7/285* (2013.01); *H02P 2007/01* (2013.01)

(58) Field of Classification Search
USPC ............ 318/34, 97, 104, 105, 106, 109, 135, 318/244, 245, 440, 442
See application file for complete search history.

(56) References Cited

U.S. PATENT DOCUMENTS

| | | | |
|---|---|---|---|
| 1,907,126 A | 5/1933 | Scofield | |
| 3,079,510 A | 2/1963 | Hartwig | |
| 3,525,912 A * | 8/1970 | Wallin | ............................. 318/17 |
| 3,854,076 A * | 12/1974 | Lambert | ....................... 318/269 |
| 3,999,890 A | 12/1976 | Niedermeyer | |
| 4,490,624 A | 12/1984 | Luker | |
| 4,835,410 A | 5/1989 | Bhagwat et al. | |
| 4,910,790 A | 3/1990 | Kershaw | |
| 5,925,999 A | 7/1999 | Lakerdas et al. | |
| 6,153,869 A * | 11/2000 | Kim et al. | ...................... 219/715 |
| 6,172,437 B1 | 1/2001 | Du | |
| 6,456,508 B1 * | 9/2002 | Namai et al. | ..................... 363/17 |
| 6,597,138 B2 | 7/2003 | Fitzgibbon | |
| 6,707,268 B1 * | 3/2004 | Bell et al. | ....................... 318/494 |
| 6,920,718 B2 | 7/2005 | Hom et al. | |
| 7,105,969 B2 | 9/2006 | Simofi-Ilyes et al. | |
| 7,116,072 B1 * | 10/2006 | Murray et al. | ................. 318/466 |
| 7,271,560 B2 * | 9/2007 | Blatterman et al. | ........... 318/466 |
| 7,825,615 B2 | 11/2010 | Chen et al. | |
| 7,884,560 B2 * | 2/2011 | Lucas et al. | .................... 318/139 |
| 7,936,139 B2 * | 5/2011 | Keller, Jr. | ....................... 318/105 |
| 2011/0113689 A1 | 5/2011 | Johnson | |

FOREIGN PATENT DOCUMENTS

WO    WO8301156    3/1983

* cited by examiner

*Primary Examiner* — Bentsu Ro
*Assistant Examiner* — Thai Dinh
(74) *Attorney, Agent, or Firm* — Fitch Even Tabin & Flannery LLP (57) ABSTRACT

A motor is configured to operate in one of at least two modes in response to determining that a power provided by a power supply for the motor crosses certain thresholds. For example, first and second windings apply a rotating force to a rotating armature of a single motor. The first and second windings are electrically coupled to first and second commutators, respectively, which transmit power to the first and second windings from a first and second power source, respectively. In other aspects, different power sources power the motor, and the motor operates at different speeds depending on the power source applied. For example, the change in power sources is effected in response to detecting a change in applied power past a threshold, thus effecting the motor's operation in a second, different speed. So configured, a single motor can reduce deployment of bulky and expensive add-on equipment.

15 Claims, 8 Drawing Sheets

MULTI-MODE MOTOR FOR SWITCHING AMONG MOTOR POWER SUPPLIES

FIELD

This application is directed to motors and using multiple power supplies to operate these motors.

BACKGROUND

Various types of motors can be used to move barriers or for other purposes. In one example, electric motors are used to move barriers such as garage doors, gates, or sliding doors. In another example, such motors are used in sump pump applications. Typically, the motor is connected to an AC power source and the AC voltage from this source is converted to a DC voltage to actually drive the motor. Sometimes, a battery backup is used when power from the mains power supply fails or is otherwise insufficient to operate the motor. In a sump pump application, water level is tracked to determine when to switch to a separate backup motor.

Different approaches have been used through the years that utilize two power sources to operate a DC motor. In one approach, a high voltage motor is selected and this motor is powered directly with the rectified mains AC voltage when the system is not in battery backup mode. When in battery backup mode, a large voltage is needed to power the high voltage motor. To generate the high voltage needed, a large number of batteries (in order to create the high-voltage) may be used. Alternatively, a small, low voltage battery and a switched-mode power supply may be used to convert the low voltage battery into a high-voltage power supply and thereby operate the motor. In either of these approaches, the cost of the system becomes high due to the requirement of large numbers of batteries or the addition of a switched mode power supply, and also the system becomes heavy and bulky with the addition of such components.

Another approach for using two power supplies with a motor utilizes a low voltage DC motor. In this case, a transformer or switched mode power supply is used to create a low voltage from the mains power source to operate the low voltage motor. In battery backup mode, the motor's operating voltage is set to match the battery voltage. However, due to the use of the transformer or switched mode power supply and the additional circuitry required, this approach is also expensive and physically heavy to implement.

Still another previous approach uses two separate motors (in two separate housing units) to move the barrier. One motor is powered directly by the rectified mains voltage source and the other motor is powered by the battery backup. However, using two motors has the disadvantage of the added expense and weight of the second motor.

SUMMARY

An apparatus and method to operate a motor in one of at least two modes in response to determining that a power provided by a power supply for the motor crosses certain thresholds. In one example, the apparatus includes first and second windings (or first and second groups of windings) wound to apply a rotating force to a rotating armature (i.e., a rotor) of a single motor (i.e., a motor whose components are encased in a single housing). The first and second windings are electrically coupled to first and second commutators, respectively, which transmit power to the first and second windings from a first power source and a second power source, respectively. More specifically, power from a first power source is selectively applied to the first commutator (and thereby the first winding), and power from a second power source is selectively applied to the second commutator (and thereby the second winding), based on a determination of the power available from one or both power sources. In response to the application of power to the windings, the armature turns, and this movement moves a barrier that is coupled to the motor (for instance, via the central shaft of the motor).

In some aspects, the approaches described herein are accomplished automatically, that is, without the requirement of any manual intervention by a user. For instance, an inadequate mains power may be detected, and in response, the power for the motor may be switched automatically to the battery backup. Because a user is not required to actuate a switch or perform another action, the switchover can occur seamlessly without disruption of supply of power and the resultant halting of the motor. This aspect in one example is implemented using a processing device configured to determine a status of at least one of a first power source or a second power source wherein the processing device is configured to select one of the first power source for application to the first commutator or the second power source for application to the second commutator in response to the status determination. The processing device can communicate with various types of sensors such as voltage sensors, current sensors, power sensors, or sensors that sense the speed of the motor can be used to sense various attributes of the power source.

In other aspects, different power sources power the motor, the motor operates at different speeds depending on the power source applied. For example, in one method, the change in application of power sources is effected in response to detecting a change in applied power past a threshold, thus effecting the motor's operation in a second, different speed. So configured, a single motor and not dual or multiple motors in separate multiple housings can so operate to reduce deployment of bulky and expensive additional equipment (either with the original device or separately provided add on elements) such as extra transformers, switched mode power supplies, or the like.

In one example, a mains power supply provides the first power supply, and a back-up battery device provides the second power supply. The power drives a motor that, in turn, moves a barrier such as a garage door, sliding door, gate, swinging door, shutters, or the like to mention but a few examples. In another application, the motor powers a pump to displace fluid in a sump pump application. In some circumstances, the mains power supply is completely cut-off or lost (or at least the amount of power is reduced to become inadequate to drive the motor to move the barrier) such that a battery back-up power supply is needed to drive the motor to move the barrier. One of the windings of the motor is configured to be powered by the mains power supply when the power from the mains power supply is determined to be adequate. The battery backup powers another winding in response to determining that the power from the mains power supply is inadequate. The switching from driving the motor as between the mains power supply and the battery backup can be accomplished automatically, without the need for a user to intervene or select the power supply to use. The determination as to whether the amount of power is adequate may, for example, involve comparing a sensed or measured power, voltage, speed (in terms of speed of a movable barrier moved by the motor or amount of fluid pumped over time, depending on the application), and/or current supplied by a power source to a threshold amount.

In another example aspect, the motor can be configured to operate at different speeds depending upon the power supply selected. For example, with the mains power supply chosen, the motor is configured to operate at a higher speed as opposed to operating at a lower speed when the battery backup is used. Because it can be desirable to operate the motor at a lower speed when the battery backup is used to reduce load on the battery and because reliance on a battery backup can be an infrequent occurrence, the winding connected to be powered by the battery backup can be designed to use less material, thereby reducing the size, weight, and cost of the winding. For example, the winding connected to be powered by the battery may include copper wire that is smaller in mass than would be required if the battery backup required high speed because the power requirement to move the barrier at a lower speed is reduced. Using one or more of these approaches reduces the size and/or weight of the motor as well as the overall cost of the system. Furthermore, the size and cost of the backup battery can be reduced because the motor requires less power to operate in battery backup mode.

So configured, these teachings support the utilization of a single motor in a single housing, thus avoiding expensive and separate multiple housings. Such a system can also reduce the use of bulky and expensive additional equipment such as extra transformers, switched mode power supplies, or the like. Additionally, these approaches can be accomplished automatically, that is, without the requirement of any manual intervention by a user. Moreover, because the motor can operate at slower speeds in certain configurations, the motor and/or power supply can be further configured to be less bulky, weigh less, and cost less than in previous arrangements.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Figure 1:
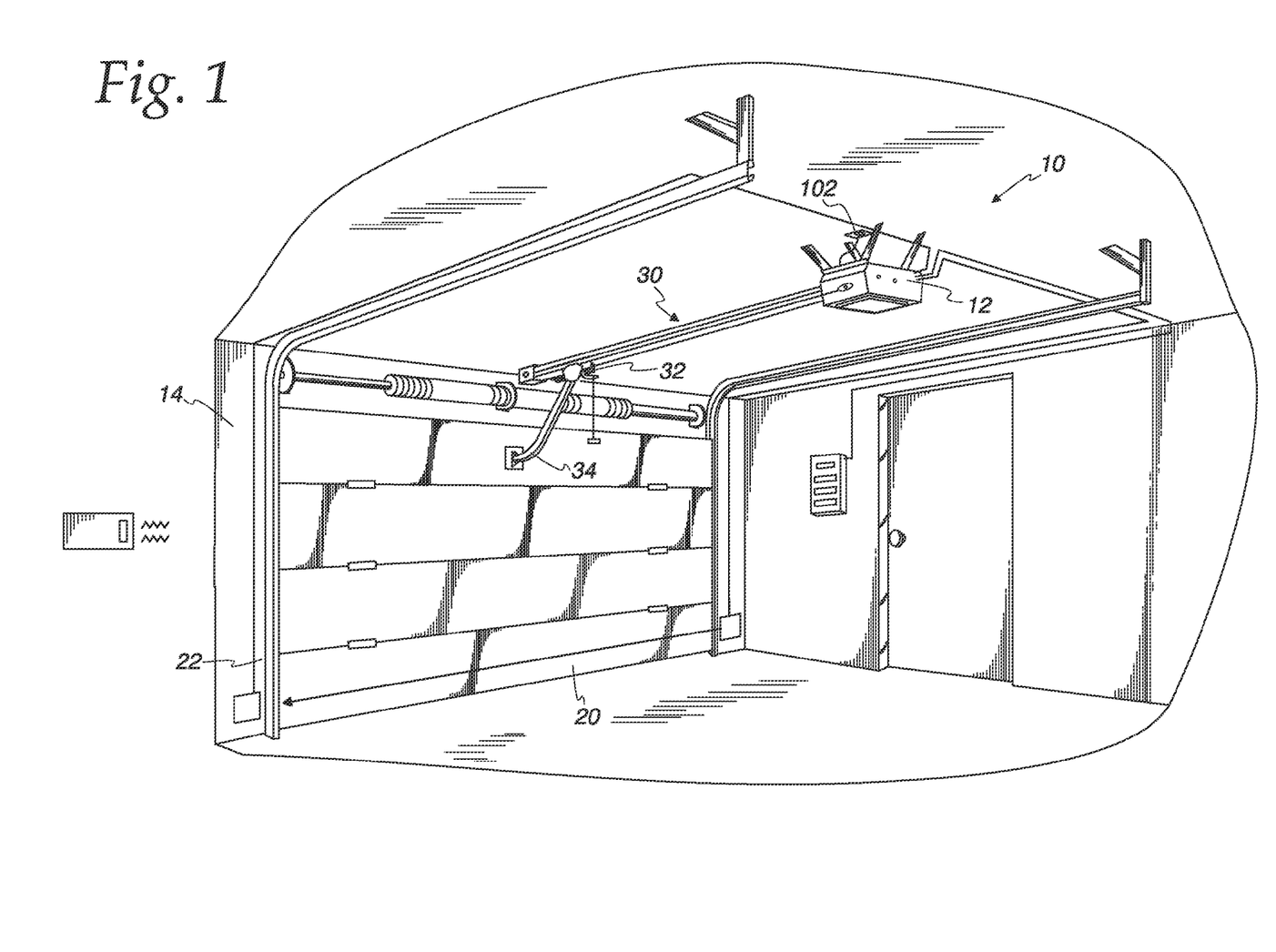
FIG. 1 comprises a perspective view of a movable barrier operator system wherein various embodiments of the invention can be applied.
Figure 2:
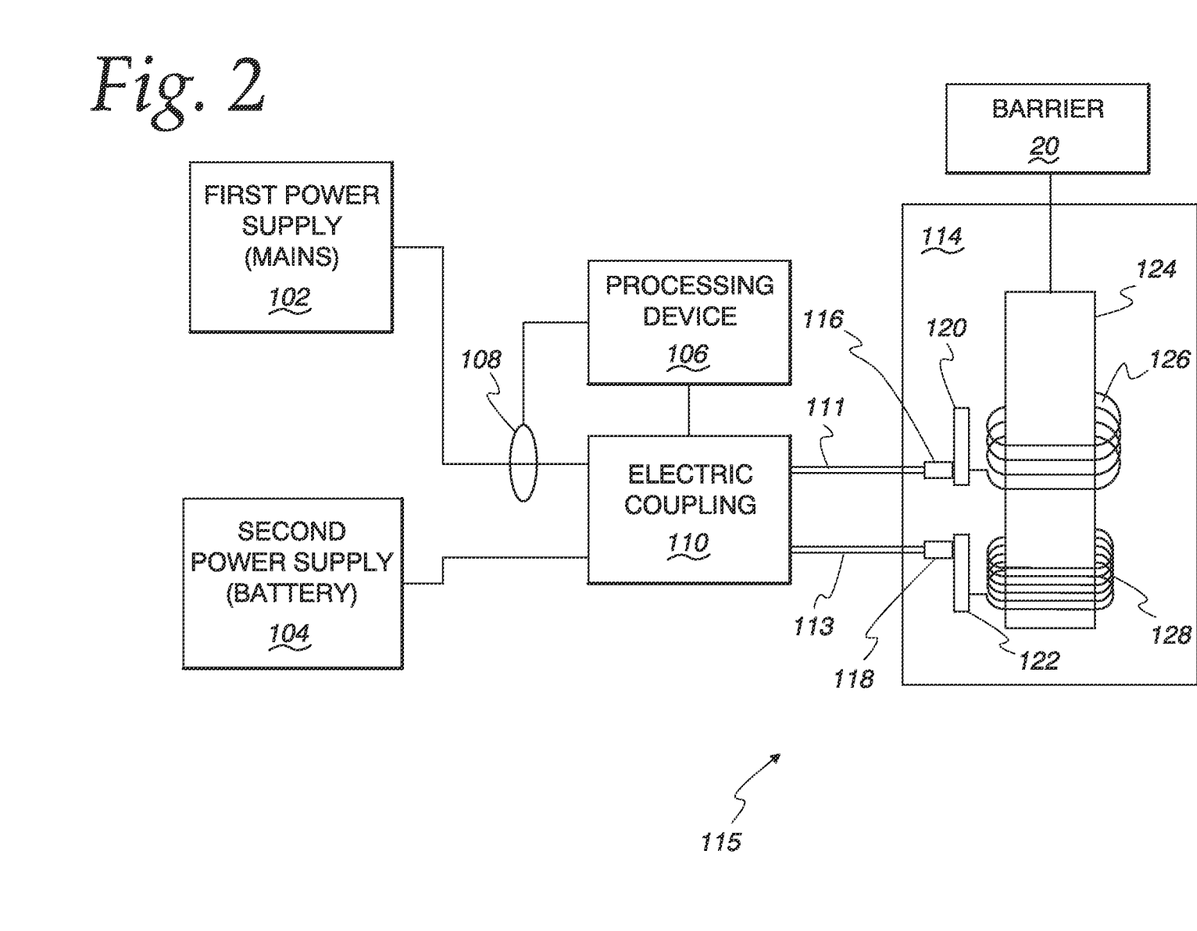
FIG. 2 comprises a block diagram of an apparatus for powering a motor that moves a barrier according to various embodiments of the invention.

Referring now to FIGS. 1 and 2, one example of a system or apparatus for powering a motor 115 is described. In this example, the motor 115 is part of a movable barrier operator system denoted as reference 10. The movable barrier operator system 10 includes a barrier operator 12 having a motor 115 that is configured to control movement of the movable barrier 20 between a first position and a second position. The movable barrier operator 12, as illustrated, is within a garage 14. By one approach, it is mounted to a ceiling of the garage 14 for operation of the movable barrier 20. In illustrated example, the movable barrier 20 is a multipanel garage door having a plurality of rollers that ride within a pair of tracks 22 and 24 positioned adjacent to and on opposite sides of a garage opening.

In the example of FIG. 1, the movable barrier operator 12 effects motion of the movable barrier 20 via a rail assembly 30. The rail assembly 30 includes a trolley 32 for releasable connection of the barrier operator 12 to the movable barrier 20 via an arm 34. The arm 34 is connected to an upper portion of the movable barrier 20 for opening and closing it. The trolley 32 is driven by a drive chain that, by one approach, is driven by a sprocket driven by the motor 115 in the barrier operator 12.

The motor 115 configured to effect movement of the movable barrier 20 in response to operation of the motor 115. In this example, the motor 115 includes a rotating armature 124 with a first winding 126 and a second winding 128, each configured to apply a rotating force on the rotating armature 124 in response to receiving power. Coupling of the armature 124 to the barrier 20 may be accomplished by any type of mechanical coupling arrangement such as using gears, shafts, levers, and/or belts to mention a few examples. The barrier 20 itself may be any type of movable barrier such as a garage door, gate, sliding door, swing door, shutters, or the like. Other examples of barriers are possible. In a typical electric motor, permanent magnets (not shown in FIG. 2) surround the armature 124 and provide a magnetic field that interacts with magnetic fields produced by current flows in the windings 126 and 128, thereby causing a force to be applied to the windings 126 and 128 and in turn, the armature 124. The armature 124 may be constructed of any suitable material, typically a metal. The motor components of this example are housed inside a single housing unit 114, which may be constructed of any appropriate material such as a metal or plastic.

The motor 115 further includes a first commutator 120 and a second commutator 122, each being coupled to the rotating armature 124 such that power supplied to the first commutator 120 flows to the first winding 126 and power supplied to the second commutator 122 flows to the second winding 128, either power application being effective to turn the rotating armature 124. In the example of FIG. 2, a first set of electrical brushes 116 transfers electrical power from first power lines 111 to the first commutator 120 and hence to the first winding 126. A second set of electrical brushes 118 transfers power from second power lines 113 to second commutator 122 and to second windings 128. The commutators 120 and 122 are, in one example, metallic rings comprising two or more segments with gaps between these segments. The commutators 120 and 122 are shown generally disposed at different ends of the armature 124. It will be appreciated, however, that the commutators 120 and 122 may be disposed at the same end of the armature 124 in other examples. The brushes 116 and 118 may be any type of motor brush known to those skilled in the art and in one example may be carbon contact pads. The power lines 111 and 113 are two-wired lines and complete an electrical connection between the motor 115 and the power sources 102 and 104, respectively.

A processing device 106 configured to determine a status of at least one of a first power source 102 or a second power source 104, wherein without user interaction and based at least upon the status, the processing device 106 is configured to select one of the first power source 102 for application to the first commutator 120 or the second power source 104 for application to the second commutator 122. The selection occurs without user interaction, in other words automatically in response to the determined status without needing a user to provide an additional input to effect the selection. This does not disclaim user input in initially setting up or modifying a general operation configuration of a system. By one approach, the first power source 102 is a mains line voltage or power supply 102, and the second power source 104 is a backup battery. The mains line voltage 102 can be obtained from a wall outlet (for example, having an AC voltage of 120V in the United States). The battery backup 104 can be any type of battery that is used to produce electrical voltage, power, and/or current. One or more individual batteries may be coupled together to form the battery backup 104.

By one approach, the status determined by the processing device 106 is associated with a parameter such as an amount of power, an amount of current, or an amount of voltage available from the first power source 102 and/or the second power source 104. The processing device 106 can do so by receiving one or more signals from a sensor 108. The sensor 108 may be any type of sensor (for example, one or more of voltage sensors, current sensors, or power sensors) that is used to sense various attributes of the power source (for example, one or more of voltage, current, or power). This sensing can be performed by directly sensing of the attribute (for example, a current probing device) or by indirect sensing such as measuring the speed of the motor, which demonstrates a loss of power. In the example of FIG. 2, the sensor 108 measures the voltage, current, and/or power of the mains line voltage 102, although an additional sensor could be disposed to measure the parameters of the second power source 104, in this example the back up battery. In these respects, the sensor 108 may be any type of sensor as known to those skilled in the art that performs this function and will not be further described herein.

The processing device 106 can be configured to control power applied to the motor in a variety of ways in response to the determination of the status of one or more of the power supplies 102 and 104. Those skilled in the art will recognize and appreciate that such a processing device 106 can comprise a fixed-purpose hard-wired platform, which could be as simple as an analog threshold circuit, or can comprise a partially or wholly programmable platform. All of these architectural options are well known and understood in the art and require no further description here.

In one approach, in response to determining that the status indicates an amount of power from the main power supply 102 below a threshold amount, the processing device 106 is configured to select the battery power source 104 to use to power the motor 115. In another approach, in response to determining that the status indicates an amount of power from the main power supply 102 above a threshold amount, the processing device 106 is configured to select the mains power supply 102 to use to power the motor 115. The threshold is chosen such that power provided at that threshold is sufficient to open a barrier connected to be moved by the motor 115. Accordingly, the threshold may vary depending on the size and type of barrier to be moved and the configuration of the motor 115. An example threshold to be monitored by the processing device 106 is 120 Volts, when used with a standard one half horsepower motor used for a typical garage door application. In other approaches, it will be appreciated that determinations made by the processing device 106 may be based, upon other factors, sensed values, or other types of information (for instance, sensed readings from other sensors not shown in FIG. 2). For instance, the processing device 106 can monitor the second power source 104 in addition to the first power source 102 to further inform the decision to switch between power sources in powering the motor 115. The processing device 106 can also determine a level of power available by monitoring the operation of the barrier operator. In one example, monitoring of the speed of the motor 115 can be used to signify a decrease in the level of power available to operate the motor 115.

In one approach to controlling the coupling of power sources to the motor 115, the processing device 106 can control the application of power through being operatively connected to an electric coupling 110. The electric coupling 110 controls the flow of electrical power, voltage, and current from the mains line voltage 102 and battery backup 104 to a motor 115. The electric coupling 110 may also perform rectification of the AC mains line voltage or other conditioning functions for the mains power supply voltage and/or the backup battery voltage.

Figure 3A:
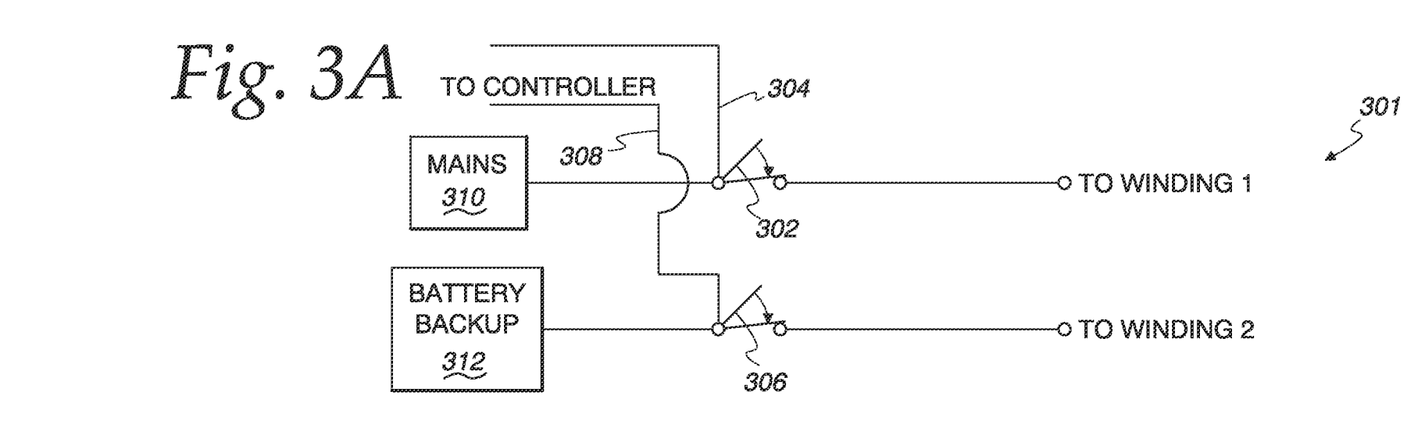
FIGS. 3A and 3B comprise examples of a switching apparatus utilized, for instance, in the apparatus of FIG. 2 according to various embodiments of the invention.

Referring now to FIG. 3A, one example electric coupling 110 is a switching circuit 301. The switching circuit 301 includes a first switch 302 coupled to a first control line 304 and a second switch 306 coupled to a second control line 308. The first switch 302 allows or disallows the flow of voltage, power, and current from a mains power supply 310 to a first winding such as the first winding 126 of FIG. 2. The second switch 306 allows or disallows the flow of voltage, power, and current from a battery backup 312 to a second winding such as winding 128 of FIG. 2. The control lines 304 and 308 control whether the switches 302 and 306 are opened and closed. For instance, the switches 302 and 306 can be electromagnetic relays controlled by the processing device. The relays can be replaced with semiconductor based transistors configured to have their respective gates electrically coupled to the control lines 304 and 308 such that voltages present on the control lines 304 and 308 effectively open and close the transistors' ability to pass power from the power sources 310 and 312. Additional electronic relays can be included to support electronic switching for advanced speed control of the motor during switching. The signals presented by the control lines 304 and 308 are themselves determined by a processing device or control arrangement, for example, the processing device 106 of FIG. 2.

Figure 3B:
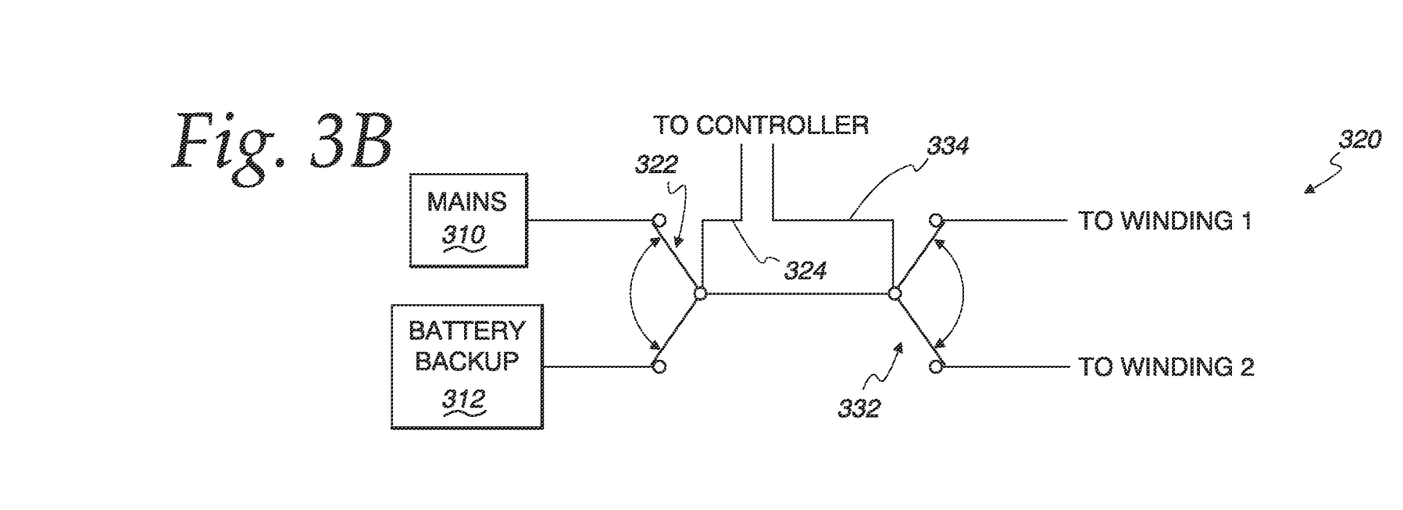

Referring now to FIG. 3B, another example switching circuit 320 is described. The switching circuit 320 includes a first switch 322 coupled to a first control line 324 and a second switch 332 coupled to a second control line 334. The first switch 322 is actuated to select whether the mains power supply 310 or the battery backup 312 is supplied to the motor. The second switch 332 is actuated to select the first winding (for example, winding 126 in FIG. 2) or the second winding (for example, winding 128 in FIG. 2). The control lines 324 and 334 control the position of the switches 322 and 332. The signals presented by the control lines 324 and 334 are themselves determined by a controller (for example, the processing device 106 of FIG. 2). In this arrangement, only one winding is energized at a time. Other examples of switching arrangements are possible.

In one aspect, referring again to FIG. 2, the electric coupling 110 is configured to selectively electrically couple a first supply 102 such as a mains power supply to the first commutator 120 and to selectively electrically couple a second supply such as a battery power source 104 to the second commutator 122. This configuration can allow the motor 115 to operate in two or more modes based upon the determined status of one or more of the power supplies 102 or 104. In one such aspect, the motor 115 is configured to operate at a first speed when the first supply such as the mains power supply 102 is electrically coupled to the first commutator 120 and to operate at a second speed when the second supply such as the battery power source 104 is electrically coupled to the second commutator 122, where the first speed is greater than the second speed, for example at least 40% higher than the second speed. In another approach, the motor 115 is configured to produce a first peak torque level when powered by the first power source 102 and to produce a second peak torque level when powered by the second power source 104, such as having the first peak torque level and the second torque level within a ratio of two to one relative to each other. One example of so configuring the motor 115 includes having a particular design for the first winding 126 that is different from that of the second winding 128 that affects the motor's 115 operating at different speeds.

For example, the windings' 126 and 128 characteristics and/or dimensions can be selected so as to be able to receive and support a particular range of voltage, current, and/or power and in response turn the armature 124 to operate the motor 115 at a particular speed or torque. In this respect, the size (for example, gage), diameter, length, weight, and/or construction material (to mention a few examples) of the wire used to create the windings 126 and 128 can be chosen to provide a particular operating speed or torque for the motor 115 in response to application of particular voltages, currents, and/or powers. The shape, size, and number of turns of the windings 126 and 128 can be similarly designed with the motor performance goals in mind. To take one example, one winding 126 can be designed to operate from a line voltage (165 DC) with a speed of 10,000 RPM while the other winding 128 can be designed to operate from a 12 VDC battery with a speed of 4,000 RPM. As such, the windings 126 and 128 may be configured, dimensioned, and/or constructed differently from each other based upon the power that can be potentially received from a particular power source.

Figure 4:
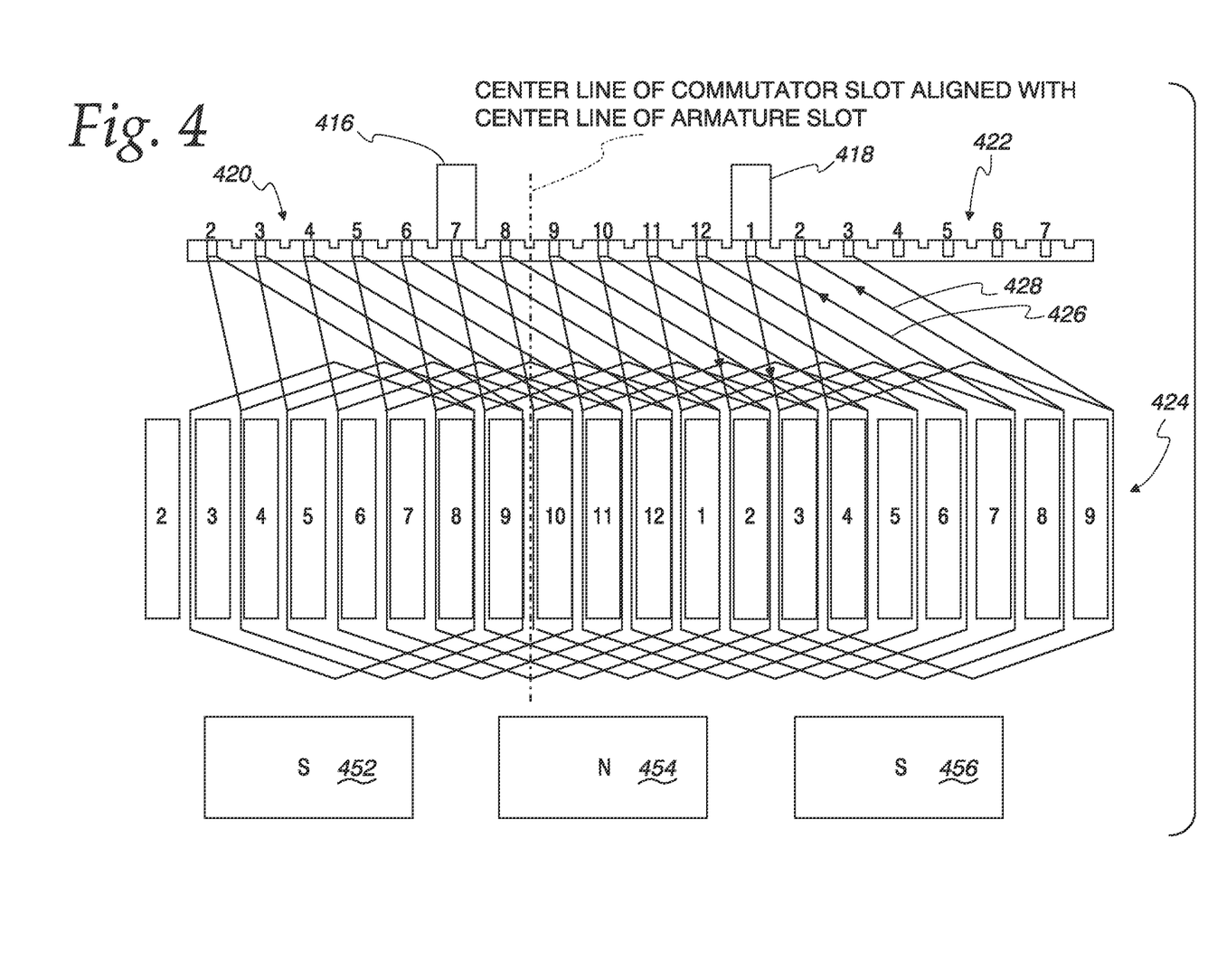
FIG. 4 comprises a winding diagram of one example approach for a dual mode motor according to various embodiments of the invention.
Figure 5:
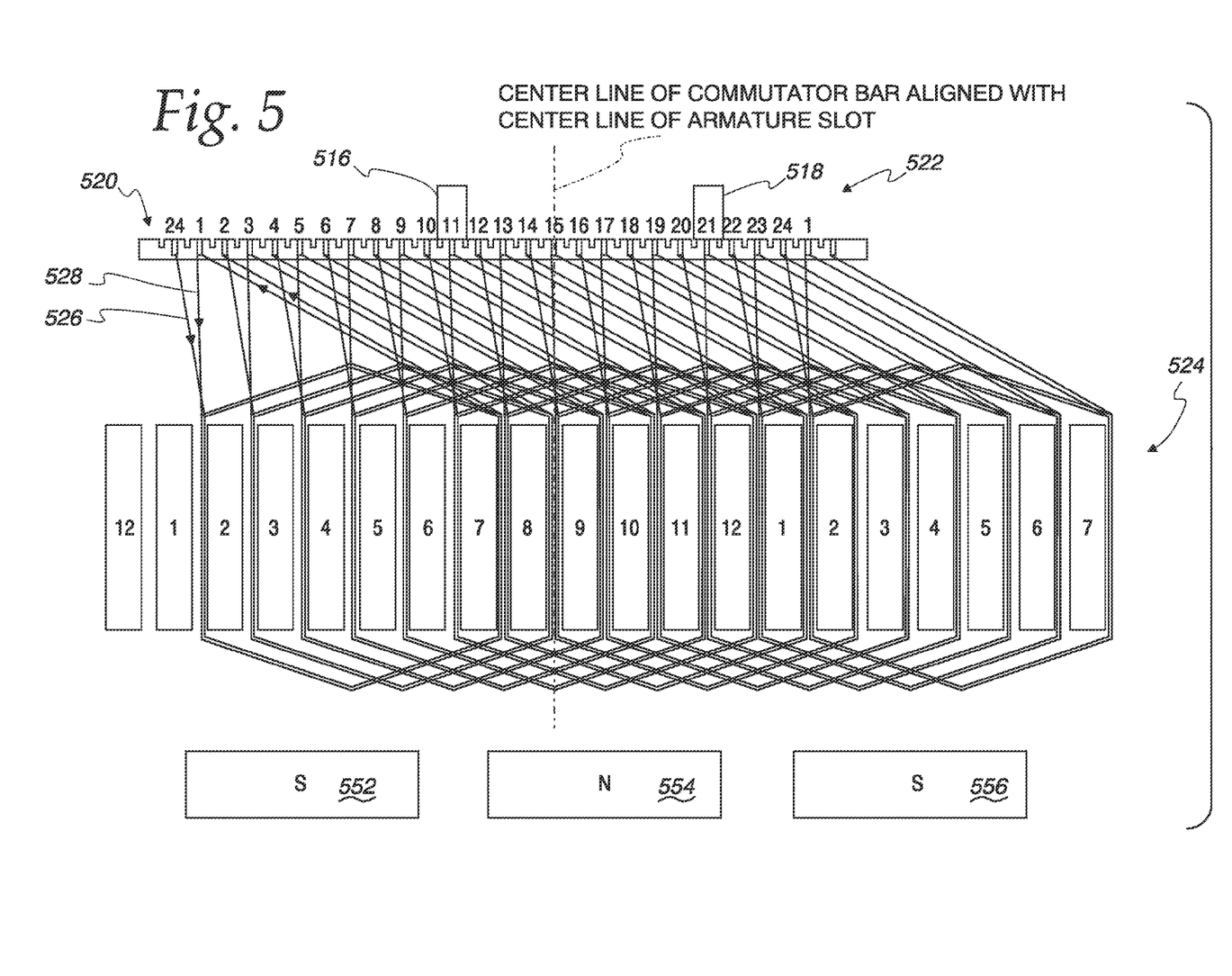
FIG. 5 comprises a winding diagram of another example approach for a dual mode motor according to various embodiments of the invention.

FIGS. 4 and 5 illustrate example winding diagrams for two example motors built according to the above teachings. FIG. 4 illustrates an example 12 bar winding pattern with brushes 416 and 418 in electrical contact with commutators 420 and 422. Windings 426 and 428 wrap around the commutators 420 and 422 and the armature 424. Permanent magnets 452, 454, and 456 are disposed relative to the armature. Example simulation data for a design such as that of FIG. 4 is included in Appendix 1. FIG. 5 illustrates an example 24 bar winding pattern with brushes 516 and 518 in electrical contact with commutators 520 and 522. Windings 526 and 528 wrap around the commutators 520 and 522 and the armature 524. Permanent magnets 552, 554, and 556 are disposed relative to the armature. Example simulation data for a design such as that of FIG. 5 is included in Appendix 2.

Turning again to FIG. 2, each winding 126 and 128 is coupled to an individual power source. For instance, the winding 126 can be configured to only selectively couple and decouple to and from the mains line voltage 102, and the winding 128 be configured to only couple and decouple to and from the battery backup 104. In other aspects, the windings 126 and 128 can be coupled to more than one power source. In one example, the winding 128 can be configured to couple to different backup systems depending on the power available from the different backup systems, although other examples are possible.

So configured, the motor 115 can be configured to operate at a higher speed when using a primary power source such as a main voltage as opposed to a lower speed when the battery backup 104 is used. Because in many applications the backup power supply is rarely used, it is often acceptable to operate the motor 115 at a lower speed when using the battery backup. Accordingly, a smaller winding 128 can be used for operating motor 115 on a battery backup resulting in using less metal in the motor. For instance, the windings 128 configured to be powered by the battery backup can be smaller, shorter, less thick, and/or weigh less than would be required if a higher speed were desired. This, in turn, reduces the overall size and/or weight of the motor 115 as well as the overall cost of the system. Furthermore, the size and cost of the backup battery 104 can be reduced because the motor 115 requires less energy to operate in battery backup mode.

Figure 6:
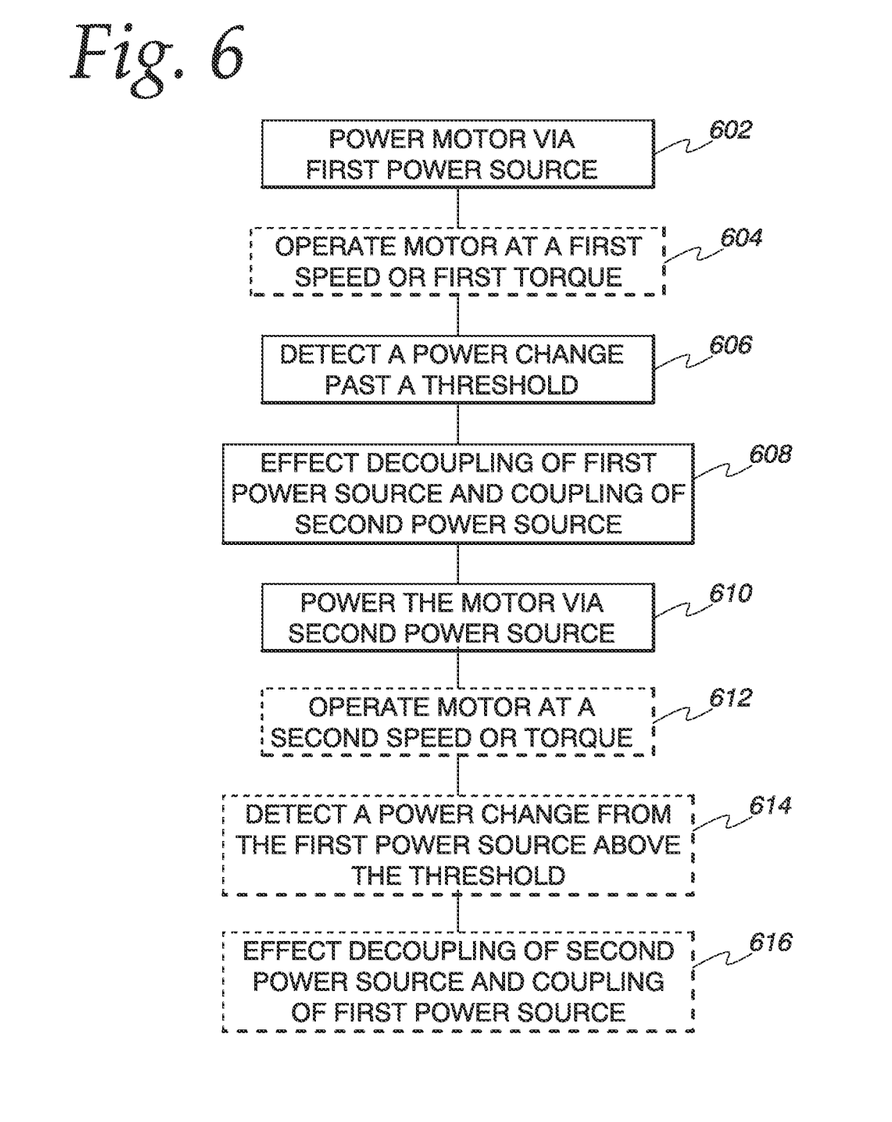
FIG. 6 comprises a flowchart of one approach for controlling the power flow to a motor that moves a barrier according to various embodiments of the invention.

Referring now to FIG. 56 one example method of operating a motor for moving a movable barrier is described. In this example, the motor includes a rotating armature, a first winding, and a second winding with the first and second windings configured to, in response to receiving an electric current, apply a rotational force on the rotating armature resulting in motor operation at different speeds. The motor also includes a first commutator electrically coupled to the first winding and a second commutator electrically coupled to the second winding. The method includes powering 602 the motor via a first power source electrically coupled to the first commutator. In one aspect, the motor may be operated 604 at a first speed and/or to produce a first torque level when powering the motor via the mains power supply. The method includes detecting 606 a change past a threshold in power supplied by the first power source electrically coupled to the first commutator. This detecting may include detecting comprises sensing an amount of power from the mains power supply below an amount needed to operate the motor. In response to the detecting, the method includes effecting 608 electrically decoupling the first power source from the first commutator and electrically coupling a second power source to the second commutator. After the effecting 608 the decoupling of the first power source and coupling of the second power source, the motor is powered 610 via the second power source electrically coupled to the second commutator. Optionally, the motor is operated 612 at a second speed or second torque level when powering the motor via a second power supply, such as a battery power source, wherein the first speed of motor operation or produced torque level under the first power supply such as a mains power supply is greater than the second speed or produced torque level. For example, the first speed can be at least 40% higher than the second speed, although the first speed can be as high as three or four times that of the second speed, or the first torque level and the second torque level are within a ratio of 2 to 1 relative to each other. In this approach, running at a lower speed when running on battery backup reduces the requirements on the battery itself. When the motor is wound for a lower speed operation, it requires less power to generate the same torque, (power=speed*torque) allowing the battery's physical size, and cost, to be reduced.

In another optional portion of the method, the method includes detecting 614 that power from the mains power supply is above the threshold. In response to this detection 614, the method includes effecting 616 electrically coupling the first power source from the first commutator and electrically decoupling a second power source to the second commutator. In this aspect, the system can automatically switch back to powering the motor by a mains power supply from the battery backup in a situation where the mains power is restored. So configured, a user need not adjust the power configuration of the motor when a mains power is lost or restored.

Figure 7:
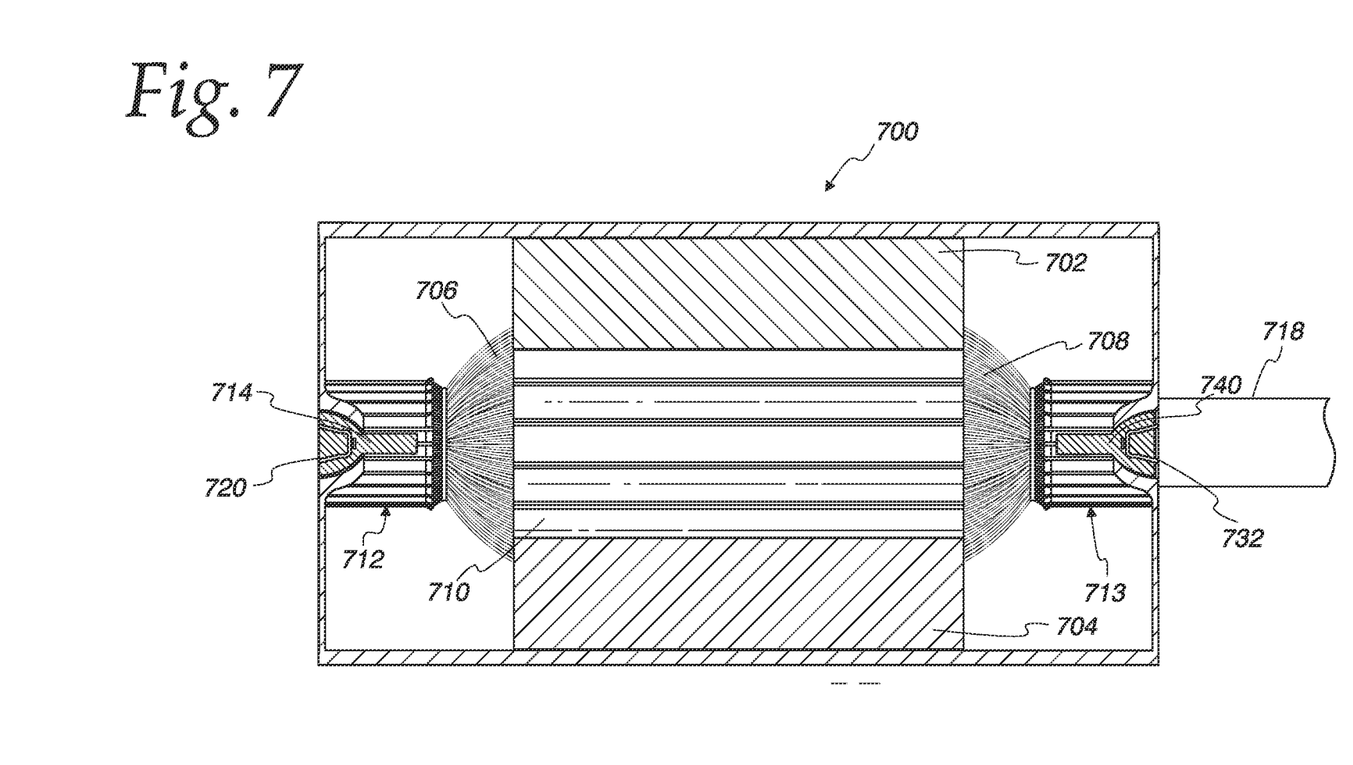
FIG. 7 is a perspective cut-away view of an example motor according to various embodiments of the invention.

Referring now to FIG. 7, one example of a motor 700 that is used to move a barrier is described. The motor 700 includes an armature 710 that is operatively coupled to a barrier (not shown in FIG. 7) via a rotating shaft 718. As the armature 710 turns, the shaft 718 rotates, which in turn moves the barrier. Magnets 702 and 704, which are permanent magnets such as ceramic based permanent magnets, each partially surrounding the armature 710. The armature 710 is configured to be an electromagnet as electric current passes through it, and it may be constructed of any suitable material such as a conducting wire. The armature 710, in practice, can have multiple poles and windings interconnected to multiple segments as is well known in that art. The motor components shown in FIG. 7 may be housed in a single housing unit that is constructed of any suitable material such as a metal or plastic.

More specifically, the armature 710 includes a first winding 706 and a second winding 708 that can be wound on top of each other but can be disposed at different ends of the armature 710. The first winding 706 is coupled to a first commutator 712 and the second winding 708 is coupled to the second commutator 713. First electrical brush 714 transfers electrical power from first power lines 720 to the first commutator 712 and hence to the first winding 706. Second electrical brush 740 transfers power from second power lines 732 to the second commutator 713 and to the second windings 708. The transfer of power from the power lines is effective to cause the armature 710 to turn and thereby rotate the shaft 718. Rotation of the shaft 718 is effective to move the barrier.

The commutators 712 and 713 in this example are metallic rings configured in two or more segments with gaps between these segments. The brushes 714 and 740 may be any type of motor brush known to those skilled in the art and, in one example, may be carbon contact pads. The power lines 720 and 732 transmit power between the power sources and the motor 700.

The windings 706 and 708 have characteristics and/or dimensions selected so as to be able to receive and support a maximum predetermined voltage, current, and/or power. In this respect, the size (for example, gage), diameter, length, weight, and/or construction material (to mention a few examples) may be chosen to support various voltages, currents, and/or powers. To take one example, a longer winding may be used to support a line voltage of 120 V as compared to supporting a battery backup voltage that is less than 120 V (for example, 12V). As such, the windings 706 and 708 may be configured, dimensioned, and/or constructed differently based upon the power received from a particular power source.

In some aspects, each winding 706 and 708 is coupled to an individual power source. For instance, the winding 706 may be selectively coupled to the mains line voltage, and the winding 708 may be coupled to the battery backup. In other aspects, only one of the windings 706 and 708 is energized at a time; however, in still other aspects it is possible to energize both windings at the same time.

So configured, the motor may be configured to operate at different speeds depending upon the power supply selected. By using a reduced size winding on the same armature as a first winding, the size, weight, and dimensions of the overall motor is reduced. A single motor with two windings eliminates the need for a second motor specifically configured to work as a backup with a backup power supply. By configuring the winding to match the needs of a barrier system in a low power environment, additional power conditioning equipment can be largely eliminated, and battery backup size can be reduced. By configuring the system to automatically switch the application of power supplies based on information from the supplies, a user does not have to manually reconfigure the system after a change in power supply status.

Figure 8:
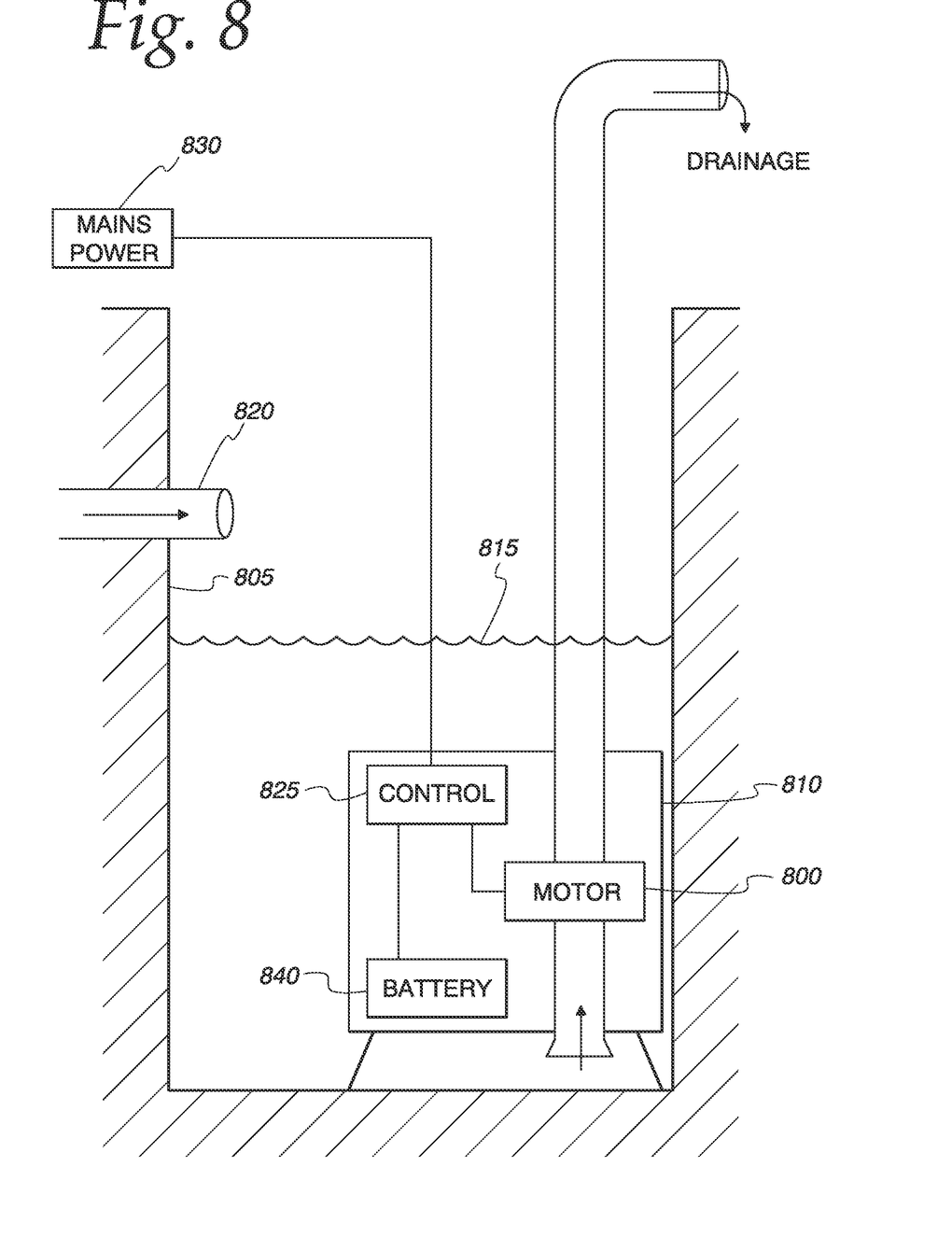
FIG. 8 comprises a side view of an example sump pump application of a dual mode motor according to various embodiments of the invention.

Another application for a dual mode motor as described herein illustrated in FIG. 8. In this example, the dual mode motor 800 is disposed in a sump 805. A sump pit 805 (or tank) is commonly found in the basement of homes to collect water from basement waterproofing systems that funnel rain or ground water into the pit instead of collecting in the basement. In this example, the motor 800 is sealed in a water tight sump pump housing 810, which is disposed at the bottom of the sump pit 805. In another common arrangement not shown, the motor is disposed above the sump pit with fluid communication between the motor and a pipe in the sump pit to allow for pumping of fluid from the sump pit. Other physical arrangements of the motor 800 relative to a sump pit 805 are possible.

In any event, water level sensors (not shown), which are known in the art, detect the water level 815 in the sump pit 805 and send signals regarding the water level to a controller 825, which is analogous to the processing device and electric coupling described above. Water collects in the sump pit 805 from the inlet 820. If the water level exceeds a certain height, the controller 825 in response to receiving signaling from the water level sensors effects operation of the motor 800 to pump fluid from the sump pit 805 to a drainage area usually located outside of the building.

The controller 825 is connected to receive power from a first power supply, the mains power 830, and from a second power supply, a battery backup 840. As described above, the controller 825 controls which power source provides power to the motor 800 based on the power that is available. In one such example, the motor 800 is configured to operate at a first pumping rate when the mains power supply 830 is electrically coupled to the first commutator and to operate at a second pumping rate when the battery power source 840 is electrically coupled to the second commutator. The first pumping rate is greater than the second speed; in one example, the first pumping rate is at least 40% higher than the second pumping rate. The pumping rate is typically measure in units of volume of fluid over a period of time, for example, 3000 gallons/hour.

In a sump pump application, having a backup power supply readily available is advantageous in the event that mains power is lost in a storm, when flooding is most likely. The dual mode motor 800 described herein is advantageous in this application because many sump pits are small or located in tightly spaced areas. Accordingly, a compact dual mode motor with a compact battery backup is particularly advantageous over bulkier two-motor systems where a second motor is triggered in response to water level.

Those skilled in the art will recognize that a wide variety of modifications, alterations, and combinations can be made with respect to the above described embodiments without departing from the scope of the invention. For instance, more than two winding can be applied to the same armature, wherein the windings are associated with different power supplies. and that such modifications, alterations, and combinations are to be viewed as being within the ambit of the inventive concept.

What is claimed is:

1. An apparatus comprising:
   a motor comprising:
   a rotating armature,
   a first winding and a second winding, each configured to apply a rotating force on the rotating armature in response to receiving power, and
   a first commutator and a second commutator, each being coupled to the rotating armature such that power supplied to the first commutator flows to the first winding and power supplied to the second commutator flows to the second winding, either power application being effective to turn the rotating armature,
   wherein the motor is configured to connect to a movable barrier to move the movable barrier between open and closed positions;
   a processing device configured to determine a status of a first power source regarding present availability of electricity from the first power source;
   wherein without user interaction and based at least upon the status, the processing device is configured to select one of the first power source for application to the first commutator or a battery-based second power source for application to the second commutator;
   wherein the motor is configured to move the movable barrier at a first speed when powered by the first power source and to move the movable barrier at a second speed when powered by the second power source;
   wherein the second winding is one or more of smaller, shorter, less thick, and less heavy than the first winding such that the first speed is greater than the second speed and the second power source lasts for a longer duration than if it powered the motor using the first commutator and first winding.

2. The apparatus of claim 1, wherein the status is associated with a parameter selected from the group consisting of: an amount of power, an amount of current, and an amount of voltage.

3. The apparatus of claim 1, wherein the first power source comprises a mains power supply and the second power source comprises a battery power source.

4. The apparatus of claim 3, wherein in response to determining that the status indicates an amount of power from the main power supply below a threshold amount, the processing device is configured to select the battery power source.

5. The apparatus of claim 3, wherein in response to determining that the status indicates an amount of power from the main power supply above a threshold amount, the processing device is configured to select the mains power supply.

6. The apparatus of claim 1, wherein the first speed is at least 40% higher than the second speed.

7. The apparatus of claim 1, wherein the motor is configured to produce a first peak torque level when powered by the first power source and to produce a second peak torque level when powered by the second power source.

8. The apparatus of claim 7 wherein the first peak torque level and the second torque level are within a ratio of 2 to 1 relative to each other.

9. A method of operating a motor, the motor comprising a rotating armature, a first winding, and a second winding with the first and second windings configured to, in response to receiving an electric current, apply a rotational force on the rotating armature resulting in motor operation at different speeds, the motor also comprising a first commutator electrically coupled to the first winding and a second commutator electrically coupled to the second winding, the method comprising:
   powering the motor via a first power source electrically coupled to the first commutator to move a movable barrier at a first speed;
   detecting a change past a threshold in power supplied by the first power source electrically coupled to the first commutator;
   effecting, in response to the detecting, electrically decoupling the first power source from the first commutator and electrically coupling a battery-based second power source to the second commutator;
   after the effecting, powering the motor to move the movable barrier at a second speed via the second power source electrically coupled to the second commutator having the second winding as one or more of smaller, shorter, less thick, and less heavy than the first winding such that the first speed is greater than the second speed and the second power source can last for a longer duration than if it powered the motor using the first commutator and first winding.

10. The method of claim 9 wherein the first power source comprises a mains power supply and the second power source comprises a battery power source.

11. The method of claim 10 wherein the detecting comprises sensing an amount of power from the mains power supply below an amount needed to operate the motor.

12. The method of claim 10 further comprising:
   detecting that power from the mains power supply is above the threshold; and
   effecting, in response to the detecting that power from the mains power supply is above the threshold, electrically coupling the first power source from the first commutator and electrically decoupling a second power source to the second commutator.

13. The method of claim 10 wherein the first speed is at least 40% higher than the second speed.

14. The method of claim 10, further comprising:
   operating the motor to produce a first torque level when powering the motor via the mains power supply, and
   operating the motor to produce a second torque level different from the first torque level when powering the motor via the battery power source, wherein the first torque level is greater than the second torque level.

15. The method of claim 14 wherein the first torque level and the second torque level are within a ratio of 2 to 1 relative to each other.

* * * * *